E. A. SPERRY.
ELECTRIC BATTERY.
APPLICATION FILED SEPT. 24, 1915.

1,321,947.

Patented Nov. 18, 1919.
2 SHEETS—SHEET 1.

WITNESSES:
F. C. Narwesen
Aug. F. Schraegle

INVENTOR.
ELMER A. SPERRY
BY Herbert H. Thompson
ATTORNEY.

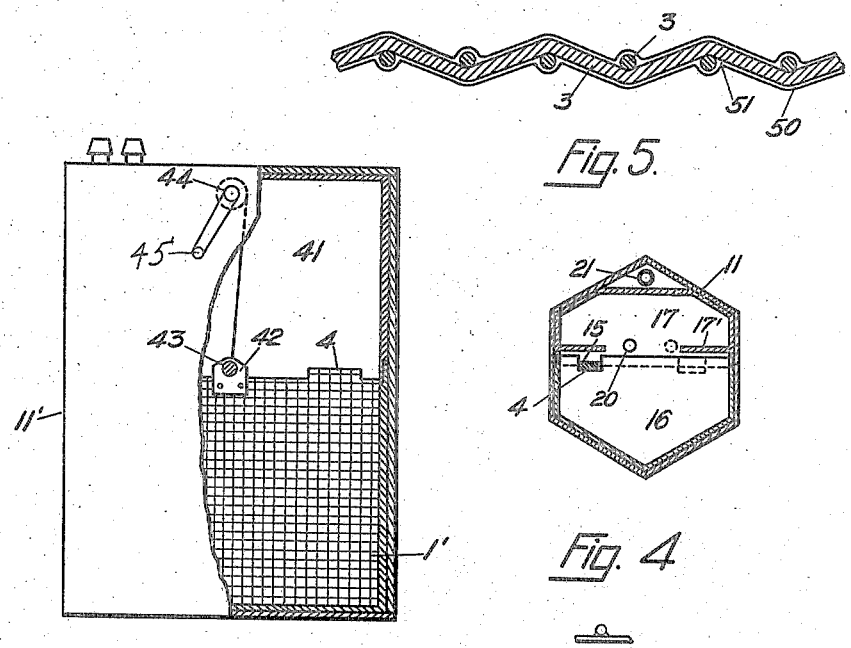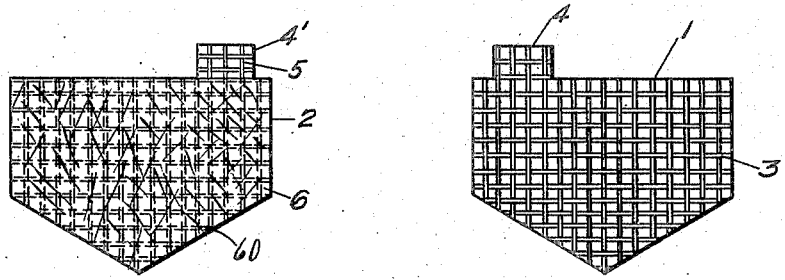

UNITED STATES PATENT OFFICE.

ELMER A. SPERRY, OF BROOKLYN, NEW YORK.

ELECTRIC BATTERY.

1,321,947. Specification of Letters Patent. Patented Nov. 18, 1919.

Continuation of application Serial No. 18,861, filed April 2, 1915. This application filed September 24, 1915. Serial No. 52,333.

*To all whom it may concern:*

Be it known that I, ELMER A. SPERRY, a citizen of the United States of America, residing at 100 Marlborough road, Brooklyn, New York, have invented certain new and useful Improvements in Electric Batteries, of which the following is a specification.

The invention relates to a battery cell designed to secure a maximum output of current or rate of discharge. For such a purpose the existing types of batteries, both of the primary and secondary types are ill-suited, being designed principally for long life and ruggedness, but having a limited current output for a given weight.

The primary object of my invention is to devise a battery suitable for the production of extremely large currents over a brief period for purposes such as driving a torpedo, but many other uses will be obvious to those engaged in the art. For such purpose, to secure maximum efficiency, a cell should be able to give up its entire charge in a very short time, sometimes as short as from three to five minutes, and should be as small and light in weight as possible.

To this end the battery should be of the highest possible electromotive force, the material of a high degree of porosity so that the active ingredient of the electrolyte may intimately contact with such material and prevent impoverishment. This property should be coupled with the highest specific electric conductive capacity of the plate or grid and non-polarizing and non-gassing properties of both the positive and negative elements.

Referring to the drawings in which what I now consider to be the preferred forms of my invention are shown:

Fig. 4 is a section on line 4—4 of Fig. 2, the scale being somewhat reduced.

Fig. 5 is a detail showing the formation of the negative plates.

Fig. 6 is a similar view on a smaller scale showing a slightly different appearance that the coating sometimes assumes.

Fig. 7 is the plan of the positive plate in its finished condition.

Fig. 8 is a similar view of the negative plate.

Fig. 9 is an end elevation partly in section of a modified form of battery.

Figure 1:
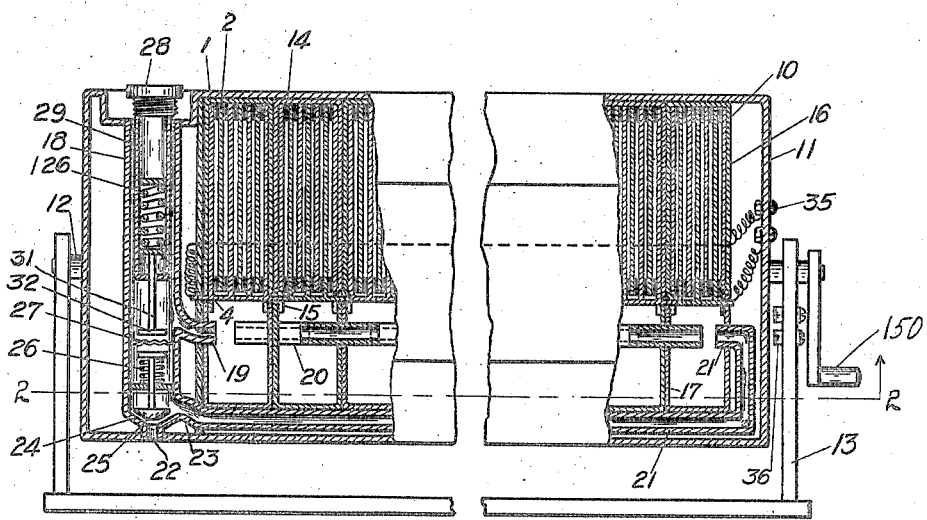
Figure 1 is a side elevation partly in section of a complete battery constructed according to my invention.

As a basis for both the cathode 2 (Fig. 7) and anode 1 (Fig. 8), I use copper preferably in a highly perforated sheet for instance in the form of gauze or wire mesh 3 or its equivalent in electric conductivity and surface exposing qualities, while the electrolyte consists preferably of dilute sulfuric acid. The copper which is normally soluble in such electrolyte is carefully coated with active materials which yield the maximum potential, but which are known to possess much lower conductivity than copper. By this means a battery of high electromotive force with very light weight and of extremely low internal resistance is secured.

Preferably zinc is used to coat the cathode, being preferably deposited on the copper gauze 3 electrolytically, as at 50. While zinc is found to yield a high chemical potential, many difficulties in the way of its use present themselves. Its high electrical resistance, its too ready solubility in the electrolyte, and its gassing and polarizing qualities all mitigate against its efficiency. The first mentioned trouble, its resistance, is overcome effectively by use of the underlying copper base, as explained above. The second and third troubles have been finally overcome by a novel treatment during or subsequent to the depositing of the zinc on the copper.

It is known that sulfuric acid of a given density will rapidly attack granulated zinc yielding large volumes of hydrogen gas; but if the same zinc is crystallized, for instance by pouring it molten into ice cold water, it is found to be in a new state in which it is passive toward the same acid and will not produce the hydrogen as above. It is zinc in this passive state or its equivalent whether physical or otherwise that has been achieved in the zinc that is deposited upon the copper base and used as my negative electrode as part of this invention.

Gassing is undesirable for a number of reasons. It causes useless depletion of the active radical or material. That is, the release of free hydrogen results from the reaction $$H_2SO_4 + Zn = ZnSO_4 + 2H$$

so that both the acid and zinc are used up, and further no electrical energy is derived therefrom so that the life of the battery is uselessly impaired.

Then again gas in the electrolyte lowers its specific conductivity and thus increases the internal resistance of the cell. The battery becomes readily polarized. Also disposition of the escaping gas causes trouble, especially in submerged chambers such as torpedoes.

I have been able to obtain zinc of the above mentioned qualities by a novel treatment during the process of depositing the zinc on the copper.

I have found that by employing certain additional agents such as pyridin in the bath, which preferably consists of zinc sulfate, that the zinc is deposited in the peculiar physical or other state described above, being practically passive in the acid electrolyte of the battery especially on open circuit and also substantially non-gassing. As a further aid to securing this result, the plate may be subsequently dipped in mercury or preferably in an amalgamating solution such as mercury bisulfate.

The zinc is also applied to a sufficient thickness and in such a manner that the wires of the copper or other mesh are more or less bound together at their intersections 51 roughly shown in Fig. 5, or at least partially united (Fig. 8) so as to prevent slippage, thereby making a more rigid and a very much stiffer plate than the gauze alone. The plates are cut so as to leave an upstanding ear 4, for joining to the next plate or cell (Figs. 1, 6 and 7) which is also coated with zinc, so as to protect the copper under all circumstances. In Fig. 2, however, the plates are shown as connected by the usual couplings 40, 41. If desired, the mesh may be given the metallic coating before the plates are formed or cut so as to facilitate the sizing operation.

The anode is prepared in a similar way by coating the copper mesh with lead 5. This may be applied mechanically but is preferably applied in a lead bath such as lead nitrate, preferably in the presence of additional agents such as residues from Curaçao aloes. The plate may then be coated with potentially active material such as lead oxid 6. Red lead is found effective, which is rendered electro-chemically active in the same general manner that the positive plate of lead storage batteries is treated and formed, i. e. by electrolysis in a suitable electrolyte, which converts the material into lead peroxid.

One way of forming the positive plate is to mount the plate or plates in the battery container together with the negative plates of an ordinary secondary battery and the usual electrolyte added. The positive plates can now be formed by means of a charging current. The liquid may then be drained off, the negative plates removed and replaced by my zinc plates, the formed positive plates removed, washed and returned to the battery and fresh electrolyte added when my cell is ready for use.

The active material may be applied in a variety of ways. One method is to make a thick paste of the material and press it on and into the plate by hand or machine. A new and improved method, however, is to make a "solution," or rather liquid paste, of the material or materials of the proper concentration or consistency and to apply it by simply dipping the plate into the solution. It is found that such a solution when properly compounded will dry on and into the meshes of the plate, leaving a uniform coating thereon and filling all the openings and spaces between the wires. It possesses many advantages over the usual method employed in the manufacture of storage battery plates in that by varying the strength of the "solution" the thickness of the coating can be readily adjusted, and in that much less labor is required to apply the coating.

The paste is preferably made up of a mixture of red lead. In the paste are also included a standard mixture of sugar and ammonium sulfate in solution. By introducing foreign material of this nature into this mixture in addition to the active material itself, the porosity, tenacity and mechanical rigidity of the plate are increased. The ammonium sulfate in the paste is converted into lead sulfate and the ammonia driven off during the drying process hereinafter described. The lead sulfate so produced forms a very efficient binder, while the action of the ammonia in escaping renders the plate more or less porous. The sugar also increases the porosity of the plate since during the washing operation the sugar is dissolved out and leaves a rigid lace-like structure.

The treatment of the plate after removal from the "dip" or "solution" is also important. Quick surface drying by subjecting to either the action of a flame, followed by slower drying and finally, when appliable, more or less gradually raising to the charring temperature of the carbonaceous ingredient may be used to produce the results described. Preferably the plating is thoroughly washed before drying to remove all acid therefrom. The porosity may also be controlled to a certain extent by the rapidity of the drying operation. For most efficient performance the plate should be very thin, and the active material on the positive extremely porous so that the electrolyte may easily penetrate, yet the grid should be internally associated with material of the highest possible electric conductivity. After drying the plate may be given a cementing bath, after which it is ready for forming. This is accomplished in the usual manner by connecting the plate as the negative electrode of an electrolytic cell containing sulfuric acid in which the positive electrode is lead.

The upstanding neck 4' is also coated with a protective coating of lead, but the active material need not be applied thereto.

Figure 2:
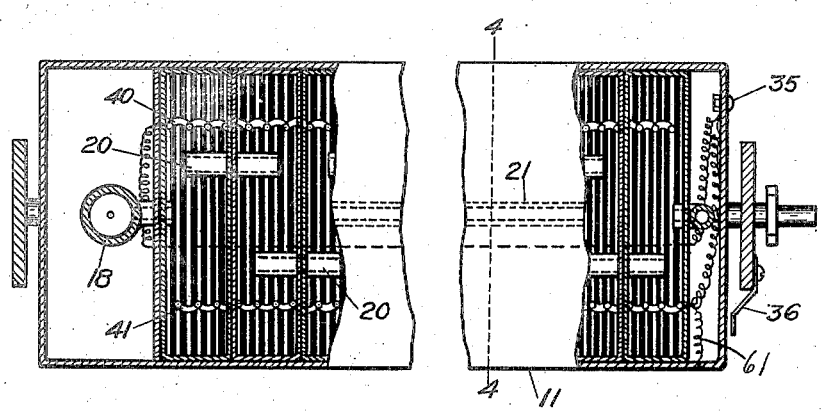
Fig. 2 is a bottom plan view partly in section of the battery, the section being taken on line 2—2, Fig. 1.
Figure 3:
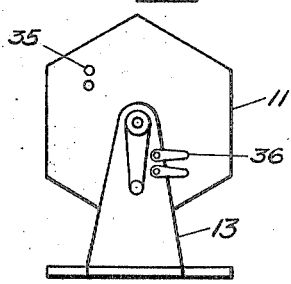
Fig. 3 is an end view of Fig. 1 on a smaller scale.

Fig. 1 shows one form my battery may assume, which I term my invertible type. Its special adaptability for torpedoes is explained in my copending application No. 18861, driving and controlling means for torpedoes, filed April 2, 1915, of which the present case is a continuation. A cell or a plurality of cells 10 are mounted in a common container 11, which is adapted to be readily inverted, as by being rotatably supported on pivots 12 on frame 13. Each cell 10 contains a plurality of plates, a positive 2 being placed between negatives 1, preferably with a separator 14 of insulating material, such as celluloid, hard rubber or the like placed therebetween. The upstanding lugs 4 on the negatives are united in each cell and jointed to the positive in the adjacent cell, being bent and brought through an aperture 15 in the cell wall. The container 11 may act as one of the conductors, if desired, as indicated by wire 61.

The cells are shown in the inverted position in Fig. 1, which is their normal position when idle or when filling with electrolyte. A handle 150 may be provided on one of pivots 12 for readily turning the battery. Each cell casing is made up preferably of two interfitting parts 16 and 17, the latter constituting a receptacle adapted to hold the electrolyte out of contact with the plates until it is desired to use the battery. A filling tube 18 is provided in casing 11, which has a spout or extension 19 entering the first receptacle 17. An overflow tube 20 connects the adjacent receptacles, so that they are filled successively and to the same level. The tubes preferably extend more than half way across each receptacle so that, after they are once filled, the liquid will not flow from one to the other, upon tipping or jarring the battery longitudinally such as would occur during shipment or in preparing a torpedo for launching.

Lateral centrally-extending partitions 17' prevent the electrolyte wetting the plates on partial tipping or rolling of the battery (see Fig. 4). The plates 17' may extend to any desired point across the cell thus determining the size of the opening between the top and bottom of the cell.

An overflow tube 21 enters the last receptacle and returns under them to a point adjacent tube 18 before it opens to the exterior of the casing at 22. Preferably the two tubes unite at 23. An opening 22 is provided in the lower end of tube 18, a valve seat 24 being provided immediately above the opening. Means may be provided for closing both the inlet and outlet at one operation. For this purpose valve 25 is mounted immediately above opening 22 and seat 24, and is normally held off the seat by coil spring 26. A flexible diaphragm 27 serves to prevent the liquid from escaping through the overflow 22, when the batteries are being filled. The plug 28, which is screwed into the top of tube 18, after filling, is provided with a hollow cylindrical extension 29 in which is mounted a spring 126 and a rod 31, which is normally pressed outwardly by the spring. The foot 32 of said rod is adapted to bear against diaphragm 27, thus pressing down valve 26 on seat 24, so that both the inlet and outlet are closed. The battery is then ready for use at will, and all that need be done to render it operative is to turn it over. Preferably contacts are provided to break the circuit when the battery is inverted, to avoid the possibility of causing a spark within the battery, and the consequent wrecking of the apparatus, since an explosive mixture including hydrogen is apt to be present in receptacles 17 when the electrolyte is in contact with the plates. For this purpose contacts such as buttons 35 are provided on a rotatable portion of the apparatus, such as on an end wall of container 11, while brushes 36 on bracket 13 contact therewith when the battery is in the operative position.

In Fig. 9, my invention is shown as made in the form of a plunge battery. The main casing 11' is made rectangular to provide space 41 above the level of the electrolyte into which the plates may be raised. A clip 42 may be provided on each plate, through all of which an insulating rod 43 is passed. Cords may be secured near the ends of said rod which extend around drums 44 rotatably mounted in the walls of the case. A crank 45 is used to rotate the drums so that the plates may be raised and lowered at will.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Thus the plates of either polarity as herein described may of course be used in conjunction with the ordinary plates or electrodes of known construction or in a different kind of containers and the invention extends to such use.

Having described my invention what I claim and desire to secure by Letters Patent is:

1. A battery plate consisting of an open wire mesh of copper, completely coated with a different metal so as to bind said wires at their intersections for increasing the rigidity of the plate.

2. In a battery, an electrode comprising a bimetallic wire mesh, having a porous active material superimposed thereon so as to fill up the meshes.

3. The method of preparing plates for batteries consisting in filling the meshes of a metallic gauze with a lead compound by dipping said gauze into a paste of said compound.

4. The method of preparing plates for batteries consisting in applying red lead to an open wire mesh by dipping the mesh into a liquid paste of the lead oxid.

5. The method of preparing plates for batteries consisting of applying lead oxid to an open wire lead mesh by dipping the mesh into a liquid paste of lead oxid.

6. The method of preparing a battery plate consisting in electrolytically coating copper gauze with lead and in applying lead oxid thereto by dipping the plate into a liquid paste of said lead oxid.

7. The process of preparing a battery which consists in charging a lead storage battery, and replacing the negative electrode with a zinc electrode.

8. The process of preparing a battery which consists in charging a lead storage battery, draining off the electrolyte, replacing the negative electrode with a zinc electrode, and refilling the battery with an electrolyte.

9. The method of preparing a battery plate consisting in electrolytically depositing lead on a copper base having openings, and then in coating the plate with lead oxid and a carbonaceous substance and highly heating the surface of the coating.

10. The process of preparing a battery which consists in charging a lead storage battery by using a lead negative, replacing said negative with a zinc electrode and immersing the positive and zinc plates in a fresh solution.

11. The process of preparing a battery which consists in charging a lead storage battery by using a lead negative electrode and replacing said lead electrode with a more electro-negative material.

12. The process of preparing a battery which consists in charging a lead storage battery, draining off the electrolyte, replacing the negative electrode with a more electro-negative electrode, and refilling the battery with an electrolyte.

13. The process of preparing a battery which consists in charging a lead storage battery, draining off the electrolyte, replacing the negative electrode with a more electro-negative electrode, washing the positive plate, and refilling the battery with an electrolyte.

14. The method of preparing a positive plate for batteries which consists in dipping a wire mesh or gauze into a liquid paste containing red lead and ammonium sulfate, allowing it to dry, and electrolytically converting the red lead into lead peroxid.

15. The method of preparing a positive plate for batteries which consists in dipping a wire mesh or gauze into a liquid paste containing red lead, sugar and ammonium sulfate, allowing it to dry, and electrolytically converting the red lead into lead peroxid.

16. In a battery, an electrode consisting of a plate of metal and a coating of zinc applied to said plate by electrolytic deposit from a bath of zinc salt and pyridin, said coating of zinc being difficultly soluble in sulfuric acid.

17. In a battery, an electrode consisting of a plate of metal and a coating of zinc applied to said plate by electrolytic deposit from a bath of zinc sulfate and pyridin, said coating of zinc being difficultly soluble in sulfuric acid.

18. In a battery, an electrode consisting of a metallic wire gauze and a coating of zinc applied to said gauze by electrolytic deposit from a bath of zinc sulfate and pyridin, said coating of zinc being difficultly soluble in sulfuric acid.

19. In a battery, an electrode consisting of a metallic wire gauze of high conductivity and a coating of zinc applied to said gauze by electrolytic deposit from a bath of zinc salt and pyridin, said coating of zinc being difficultly soluble in sulfuric acid.

20. A battery plate consisting of a copper gauze supporting structure, a coating of lead on said copper and a porous, active material of lead peroxid in the meshes of said gauze.

21. The method of preparing an anode plate for batteries which comprises applying a paste containing a lead compound and a soluble substance to a grid, subsequently exposing said substance to a solvent and converting the lead compound to lead peroxid.

In testimony whereof I have signed my name to this specification, this 21st day of September 1915.

ELMER A. SPERRY.